United States Patent [19]

Bishel

[11] 3,778,588

[45] Dec. 11, 1973

[54] SELF-SHIELDING CORED WIRE TO WELD CAST IRON

[75] Inventor: Robert Anthony Bishel, Huntington, W. Va.

[73] Assignee: The International Nickel Company, Inc., New York, N.Y.

[22] Filed: Mar. 29, 1972

[21] Appl. No.: 239,351

[52] U.S. Cl. ................. 219/146, 117/206, 219/137
[51] Int. Cl. ............................................ B23k 35/22
[58] Field of Search ................... 219/146, 145, 137, 219/73; 117/202–207; 148/24, 26

[56] References Cited
UNITED STATES PATENTS

| | | | |
|---|---|---|---|
| 3,235,405 | 2/1966 | Quaas | 117/207 |
| 3,253,950 | 5/1966 | Wasserman et al. | 117/207 |
| 3,466,422 | 9/1969 | Witherell | 219/146 |
| 2,855,333 | 10/1958 | Wasserman et al. | 219/146 |
| 2,139,522 | 12/1938 | Shepherd et al. | 117/205 |
| 3,114,033 | 12/1963 | Elster et al. | 219/146 |
| 3,328,557 | 6/1967 | Rogers et al. | 219/146 |
| 2,499,827 | 5/1950 | Kihlgren | 117/205 |

Primary Examiner—J. V. Truhe
Assistant Examiner—George A. Montanye
Attorney—Ewan C. MacQueen et al.

[57] ABSTRACT

A cored wire welding electrode for welding cast iron having an outer sheath made of nickel or a nickel-iron alloy and a powdered core composition containing copresent metallic magnesium and graphite and slag-forming and alloying ingredients. The electrode is particularly useful for open-arc welding of cast iron to itself and to compatible metals.

8 Claims, No Drawings

SELF-SHIELDING CORED WIRE TO WELD CAST IRON

The present invention is concerned with arc welding of cast iron and, more particularly, with a bare wire electrode suitable for high rate arc welding of cast iron by automatic coil-fed welding machines.

As far as applicant is aware, there is a need for commercially satisfactory, bare wire, consumable electrodes for depositing graphite-containing weld metal and suitable for open-arc welding of gray cast iron and ductile cast iron structures at high rates both to themselves and to compatible metals.

Flux-coated welding rods such as those disclosed in U.S. Pat. No. 2,499,827 are satisfactory for arc welding of cast iron. However, flux-coated weld rods are not suitable for use in automatic welding machines for the reasons that the flux coating prevents maintenance of electrical contact between the rod and the current source and a flux-coated rod generally cannot be coiled without flake-off of the flux coating.

Applicant is also aware of consumable weld rods which can be used to weld cast iron using an inert gas shield. While use of an inert gas shield (the M.I.G.) process is practical, it is necessarily limited by virtue of the fact that a source of inert gas must be available at the welding site and that apparatus must be available to position the gas around the arc.

It has now been discovered that by means of a novel combination of ingredients, an advantageous bare wire, open-arc welding electrode for cast iron can be provided.

It is an object of the present invention to provide a novel bare wire, open-arc welding electrode suitable for welding cast iron.

Another object of the invention is to provide a novel process of welding cast iron employing the novel bare wire, open-arc welding electrode of the present invention.

Other objects and advantages will become apparent from the following description.

Generally speaking, the present invention contemplates a cored-wire welding electrode adapted to weld gray cast iron or ductile cast iron comprising a tube of an alloy containing about 45 percent to about 100 percent nickel with the balance, if any, being essentially iron, the tube comprising about 75 percent by weight of the total electrode and enclosing core composition which comprises the balance of the electrode. The core composition contains, in per cent by weight of core composition, a mixture of fine powders comprising about 0.7 percent to about 3.5 percent magnesium advantageously alloyed in a concentration of less than about 70 percent (as, for example, in the form of about 5 percent to about 20 percent nickel-magnesium alloy containing about 14 percent to 17 percent magnesium and/or in the form of a magnesium-aluminum alloy containing about 65 percent magnesium) about 5 percent to about 25 percent graphite, up to about 10 percent aluminum, up to about 3 percent alloyed calcium metal, up to 7 percent metallic silicon, both calcium and silicon being present, for example, in the form of up to about 7 percent calcium-silicon alloy with the calcium being about 30 percent to 33 percent of the alloy or with silicon being present in the form of up to about 20 percent of an alloy containing about 60 percent nickel, 30 percent silicon and about 10 percent iron, up to about 15 percent electrolytic manganese (or up to about 35 percent ferromanganese), about 60 percent or even 75 percent calcium fluoride, up to 15 percent cryolite, up to about 6 percent periclase, i.e., magnesium oxide, and up to about 4 percent barium fluoride. The core can also contain up to about 5 percent titanium as titanium metal or nickel-titanium or ferro-titanium alloy, up to about 25 percent iron, up to about 36 percent nickel, the iron and the nickel ranges being inclusive of iron and nickel alloyed with magnesium, silicon, manganese, titanium and the like, up to about 5 percent barium carbonate, up to 5 percent strontium carbonate, up to about 25 percent calcium carbonate, up to 10 percent manganese dioxide and up to about 4 percent zirconium oxide. The core compositions used in the electrode of the present invention can also include as slag-forming substances up to about 20 percent calcined alumina, up to about 10 percent calcium silicate, up to about 10 percent hematite (ferric oxide), up to about 5 percent lithium carbonate, up to about 5 percent lithium fluoride, up to about 20 percent nepheline syanite, up to about 5 percent potassium zirconium fluoride, up to about 10 percent titanium dioxide and up to about 10 percent sodium fluoride. Other metallics which can be incorporated into the core composition include up to about 6 percent columbium, as, for example, up to about 10 percent ferrocolumbium, up to about 4 percent molybdenum as, for example, up to about 5 percent ferromolybdenum, up to about 6 percent of rare earth silicide and up to about 1 percent tungsten. Generally speaking, the ratio of nickel to metallic iron in the electrode is at least about 0.67.

While it is possible to form the electrode of the present invention using a seamless tube of nickel-iron alloy containing at least 3 percent by weight of iron, it is advantageous to form the nickel-iron alloy tube from nickel-iron alloy strip. The tube filled with the core material is made by bending the strip into a U-shaped trough, depositing the powdered core composition in the trough, further bending the ends of the trough to overlap, and drawing down the thus formed tube to a slightly smaller size so as to consolidate the powdered core materials within the tube. As a general rule, the core materials used to fill the nickel-iron alloy tube are pulverized so as to pass through a No. 30 U.S. Standard Sieve Series Screen and are thoroughly blended prior to being placed in the tube to form the electrode.

Those skilled in the art will appreciate from the foregoing broad description that alloy constituents of the weld deposits produced using the aforedescribed welding electrode are derived both from the tube and the core material. The metal of the tube can contain elements in addition to nickel and iron, such as up to about 0.35 percent carbon, up to about 1 percent silicon, up to about 1 percent copper and up to about 3 percent manganese. Impurities such as sulfur and phosphorus should be maintained as low a level as practical in the alloy of the tube. It is essential in considering the composition of the tube portion of the electrode of the present invention that the alloy constituting the tube must be workable to the extent necessary to produce tube from strip or by means such as extrusion to produce a seamless tube. Consequently, amounts of carbon, for example 2 percent by weight, such as have been used heretofore in wire weld rods of nickel-iron alloy useful in welding cast iron are impractical in the alloys which are employed to form the tube portions of the electrodes of the present invention. The major proportion of carbon, manganese and silicon in the weld deposit resulting from welding with the electrode of the present invention is derived from the core composition. When weld rods containing the core ingredients as specified hereinbefore are employed in open-arc welding, it is a general rule that approximately one-third of the free carbon, approximately one-half of the aluminum and silicon and approximately two-thirds of the manganese content of the core wire will be recovered in the weld deposit. Less than 10 percent of the magnesium and calcium present in the electrode will be recovered as metallic material in the weld deposit. The greater proportion of magnesium, calcium and carbon present in the weld rod serves to prevent undue oxidation of the electrode during welding. The excess amount of these elements over and above those amounts recovered in the weld deposits cooperate with the fluxing ingredient to provide an electrode which will operate in air without the need for protective environments such as inert gas or excess slag ingredients on the surface of the metal to be welded. Of course, if desired, welding electrodes of the present invention can be used with gas shielding, for example, with carbon dioxide shielding, or with excess slag in the submerged arc process.

The welding electrode of the present invention can be employed to weld cast iron, ductile cast iron and other ferrous and non-ferrous base metal. Weld deposits formed using the welding electrode of the present invention contain free graphite and thus do not tend to dilute the parent metal in carbon. Furthermore, the nickel content of the welding electrode is maintained at a sufficiently high level so that the nickel content of the weld deposit will not be diluted by the parent metal so as to form brittle areas in the welded structure. Advantageously, when welding with the welding electrode of the present invention, the work piece which is being welded is preheated to about 500°F. (about 250°C.) to about 800°F. (about 450°C.). While such preheating is advantageous, satisfactory welds on gray cast iron have been made without preheating. As those skilled in the art will appreciate, the welding electrode of the present invention can be made in extremely long continuous lengths, and thus is particularly adapted to be used in automatic welding machines. If desired, however, the welding electrode of the present invention can be prepared as rods in lengths of 12 to 14 inches (about 30 to about 35 cm.) and used manually in the conventional manner. These short lengths can also be coated. The welding electrodes of the present invention can be used with all types of welding current configurations, e.g., direct current, direct current reversed polarity, alternating current, etc. Table I sets forth in per cent by weight the composition of the novel welding electrode, i.e., the per cent by weight of ingredients based upon the total weight of the core and the tubular sheath.

TABLE I

| Ingredient | Specific Example % by weight | Advantageous Range % by weight |
| --- | --- | --- |
| Carbon (as graphite) | 3.60 | 1.5–7.5 |
| Manganese | 1.55 | up to 7.5 |
| Iron | 33.70 | 9–42 |
| Nickel | 42.80 | 29.3–76 |
| Nickel and iron | — | 65–85 |
| Silicon (metallic) | 0.875 | up to 2.5 |
| Copper | 0.035 | up to 0.7 |
| Aluminum | 0.030 | up to 2 |
| Calcium (metallic) | 0.38 | up to 1 |
| Magnesium (metallic) | 0.42 | 0.25–1.0 |
| $CaF_2$ | 13.10 | 8–18 |
| $Na_3AlF_6$ | 2.25 | 0–3 |
| $BaF_2$ | 0.75 | 0–1.5 |
| MgO | 0.51 | 0.25–1.5 |

Those skilled in the art will appreciate that, as disclosed hereinbefore, the magnesium, silicon and calcium are not usually included in the welding electrode of the invention as pure metal. In addition to the nickel-magnesium alloy specifically disclosed hereinbefore, magnesium can be used in the form of nickel alloy containing as much as 60 percent magnesium, iron-silicon-magnesium alloys containing as much as 50 percent magnesium with optional amounts of nickel, cerium and other incidental elements. Silicon can be present along with calcium as calcium silicon alloy as well as a component in a magnesium-containing alloy.

While it has been stated hereinbefore that the tube portion of the welding electrode of the present invention comprises about 75 percent by weight of the electrode with the core being the balance, those skilled in the art will appreciate that some modification of this ratio is possible. For example, if the core composition is modified to include iron and nickel in the maximum amounts as set forth hereinbefore, the weight of the tubular sheath can be as low as about 55 percent by weight of the total electrode. Thus, it is within the contemplation of a more advantageous aspect of the present invention that the tube can comprise about 55 percent to about 80 percent by weight of the welding electrode provided that the total per cent of nickel plus iron in the electrode is about 65 percent to about 85 percent and the ratio of nickel to iron is about 0.82 to about 1.6. It is generally advantageous to maintain the tubular sheath at about 65 percent to 80 percent by weight of the electrode with the core being about 20 percent to 35 percent by weight of the electrode and to form the sheath from an alloy containing a maximum of about 75 percent nickel.

In order to give those skilled in the art a better understanding and appreciation of the invention, the following Examples are given.

EXAMPLES

Cored wire welding electrodes were made from seven parts by weight of strip 0.417 inch (about 1.05 cm.) wide and 0.014 inch (about 0.035 cm.) thick of an alloy containing in percent by weight 55 percent nickel, 0.35 percent manganese, 0.20 percent silicon, 0.05 percent carbon, 0.005 percent each of sulfur and phosphorus, 0.5 percent copper and about 44 percent iron and about 3 parts by weight of core composition. The strip was bent into a U-shaped trough. The thoroughly mixed, finely divided core composition was metered into a trough and the strip was then bent into a circular configuration about 0.12 inch (about 0.305 cm.) in diameter by the rolls of a Yoder mill. The thus formed tube was then drawn down to diameters of 0.109 inch (about 0.277 cm.), 0.093 inch (about 0.246 cm.), 0.078 inch (about 0.198 cm.) and 0.062 inch (about 0.157 cm.) to consolidate the core ingredients using soap as a lubricant. Table II sets forth the percent by weight of core ingredients in six Examples of welding electrodes made in the described fashion.

TABLE II

| Example No. | 1 | 2 | 3 | 4 | 5 | 6 |
|---|---|---|---|---|---|---|
| Mg(14)-Ni | 10.00 | 10.00 | 8.00 | 10.00 | 10.00 | 10.00 |
| Graphite | 15.00 | 15.00 | 13.00 | 18.00 | 14.00 | 15.00 |
| Aluminum | 5.00 | 6.00 | 1.00 | 6.00 | 1.00 | 6.00 |
| Calcium fluoride | 53.00 | 42.00 | 54.00 | 39.00 | 52.00 | 44.00 |
| Magnesium oxide | 2.00 | 2.00 | 2.00 | 2.00 | 2.00 | 2.00 |
| Calcium (30) silicon | 5.00 | 4.00 | 4.00 | 4.00 | 5.00 | 5.00 |
| Manganese | 5.00 | 5.00 | 8.00 | 5.00 | 4.00 | 4.00 |
| Cryolite | 5.00 | 6.00 | 8.00 | 6.00 | 9.00 | 4.00 |
| Barium fluoride | | | | 2.00 | | 2.00 |
| Strontium carbonate | | | | | 1.00 | |
| Iron powder | | 10.00 | | 10.00 | | 10.00 |

Extended lengths of the welding electrodes of Examples 1 to 6 were employed in a MC-750 Hobart CP welding machine having a SA-Hobart Automatic Wire Feeder and a Linde Oscillator at an arc voltage of 25 to 29 volts and a direct current (reversed polarity) of 350 to 400 amperes to weld gray cast iron, to weld ductile cast iron and to build up weld deposit. The gray cast iron contained about 3.35 percent carbon, 2.11 percent silicon, 0.85 percent manganese 0.110 percent sulfur, and 0.015 percent phosphorus, The ductile cast iron contained about 3.47 percent carbon, about 2.25 percent silicon, about 0.30 percent manganese, about 0.030 percent phosphorus, about 0.026 percent sulfur and about 0.055 percent metallic magnesium. The all-weld deposit from the welding electrode of Example 1 contained, in addition to iron, about 2.03 percent carbon, about 1.35 percent manganese, about 0.002 percent sulfur, about 0.87 percent silicon, about 51.29 percent nickel, about 1.36 percent aluminum, about 0.33 percent titanium, about 0.032 percent magnesium with the carbon being essentially in the form of spheroids.

Welding electrodes of the present invention have been employed to weld castings of gray cast iron and ductile iron with and without preheat. Ductile cast iron and gray cast iron can be preheated to 600°F. (about 315°C.) or above. Table III contains the results of mechanical testing of weldments made with welding electrodes of the present invention.

TABLE III

| Example No. | Type of cast iron | Direction of test specimen | U.T.S. K.s.i.* | U.T.S. Kg./mm.² | Elong. (percent) | R.A. (percent) | Carbon in weldment (percent) |
|---|---|---|---|---|---|---|---|
| 1 | Gray | Transverse | 17.0 | 12.0 | 0.5 | | 2.05 |
| 2 | do | do | 26.5 | 18.6 | 0.7 | | |
| 2 | do | do | 31.0 | 21.8 | 0.7 | | |
| 6 | do | do | 34.5 | 24.2 | 0.5 | | 2.28 |
| 6 | do | do | 35.0 | 24.6 | | | |
| 1 | do | Longitudinal | 65.0 | 45.7 | 14 | 20.6 | 1.84 |
| 6 | do | do | 65.1 | 45.8 | 13.0 | 17.3 | |
| 2 | Ductile | Transverse | 54.0 | 38.0 | 2.8 | 6.0 | |
| 2 | do | do | 58.0 | 40.7 | 5.0 | 7.5 | |

*K.s.i.=thousands of pounds per square inch.
U.T.S.=Ultimate Tensile Strength.
Elong.=Elongation.
R.A.=Reduction in Area.
Kg./mm.²=kilograms per square millimeter.

The weldments with ductile iron contained no pores, cracks or other defects. Weldments made with gray cast iron, whether preheated or not, contained no cracks. However, the casting welded without preheat had larger pores on the top surface in the weld near the heat affected zone of the base metal than did the weldment on the preheated casting.

A number of welds were made with the welding electrode of Example 5 in the form of wire 0.093 inch (about 0.246 cm.) in diameter. Mechanical characteristics of these welds together with conditions of preheat and post-heat (if any) are set forth in Table IV.

TABLE IV

| Type of iron casting | Preheat | Weld | Ferritize* | U.T.S. K.s.i. | U.T.S. Kg. mm.² | Elong., percent |
|---|---|---|---|---|---|---|
| Gray | 600° F | Transverse | Yes | 21.0 | 14.7 | 0.5 |
| Do | 600° F | Longitudinal | No | 51.5 | 36.2 | 3.5 |
| Do | 600° F | Transverse | Yes | 22.0 | 15.5 | 0.5 |
| Ductile | 600° F | do | No | 58.0 | 40.7 | 4.0 |
| Do | 600° F | do | No | 53.0 | 37.2 | 2.5 |
| Do | 600° F | do | Yes | 60.0 | 42.2 | 11.5 |
| Do | 600° F | do | Yes | 60.0 | 42.2 | 10.0 |
| Do | 600° F | do | No | 63.0 | 44.3 | 6.0 |
| Do | 600° F | do | No | 60.5 | 42.5 | 5.5 |
| Do | 600° F | do | Yes | 60.0 | 42.2 | 9.5 |
| Do | 600° F | do | Yes | 61.5 | 43.2 | 10.5 |
| Do | No | do | No | 55.5 | 39.0 | 2.5 |
| Do | No | do | No | 54.5 | 38.3 | 2.0 |
| Do | No | do | Yes | 58.0 | 40.7 | 7.0 |
| Do | No | do | Yes | 59.5 | 41.8 | 7.0 |
| | | All weld | No | 62.0 | 43.6 | 13.5 |
| | | do | No | 59.5 | 41.8 | 10.0 |
| | | do | Yes | 63.0 | 44.3 | 14.5 |
| | | do | Yes | 62.5 | 44.9 | 16.2 |
| Ductile | No | Longitudinal | No | 60.0 | 42.2 | 13.5 |
| Do | No | do | No | 65.4 | 46.0 | 13.5 |

*The ferritizing post-weld heat treatment comprises holding the welded casting at 1,550° F. (about 840° C.) to 1,650° F. (about 900° C.) for 3 hours plus furnace cooling to 1,275° F. (about 690° C.) and holding at this temperature for 5 hours plus furnace cooling to 1,100° F. (about 590° C.) following by air-cooling.

The welding electrode of Example 5 was also used to weld iron castings in the submerged arc process. The results of such welding carried out using an arc current of about 350 amperes (D.C. reverse polarity), an arc voltage of 31 to 32 volts, an electrode extension of 1-inch (about 2.5 cm.), a travel speed of about 13 inches (about 33 cm.) per minute a commercially available submerged arc flux and no preheat are set forth in Table V.

TABLE V

| Orientation | U.T.S. ksi | kg/mm² | Elong. (%) | Hardness Rb* | Type Casting |
|---|---|---|---|---|---|
| Longitudinal | 73.5 | 51.6 | 17.0 | 80 | Gray |
| Transverse | 63.5 | 44.6 | 4.5 | 82 | Ductile |
| All Weld | 68.9 | 48.4 | 24.5 | 75 | — |
| Longitudinal | 71.5 | 50.2 | 17.0 | 79 | Gray |
| Longitudinal | 74.3 | 52.2 | 17.0 | 82 | Gray |

Rb = in Rockwell B units

The chemistries of the weld deposits, the results of which are set forth in Tables IV and V, were similar except that those weldments made by the submerged arc-process (Table V) contained about 3 percent manganese whereas those made in the open-arc process (Table IV) contained about 1 percent manganese. Averaged and rounded-off values for percent by weight of elements other than iron in the weld deposits are set forth in Table VI.

TABLE VI

| Process | C | Mn | S | Si | Ni | Al | Ti | Mg |
|---|---|---|---|---|---|---|---|---|
| Open-arc | 1.7 | 1.1 | 0.003 | 0.8 | 53.5 | 0.35 | 0.2 | 0.04 |
| S.A.* | 1.6 | 3.0 | 0.003 | 0.7 | 51.0 | 0.14 | ----- | 0.01 |

*Submerged arc.

Other welding electrodes in accordance with the present invention are set forth in Table VII in terms of percent by weight of the tube alloy and the percent by weight of the core composition.

TABLE VII

| Example No. | 7 | 8 | 9 | 10 | 11 |
|---|---|---|---|---|---|
| Tube alloy (percent): | | | | | |
| Ni | 60 | 50 | 53.9 | 56.3 | 55.1 |
| Mn | 0.37 | 0.31 | 0.42 | 0.24 | 0.35 |
| Si | 0.25 | 0.20 | 0.11 | 0.30 | 0.22 |
| C | 0.07 | 0.06 | 0.05 | 0.01 | 0.03 |
| Fe | Bal. | Bal. | Bal. | Bal. | Bal. |
| Wt. tube/wt. core plus tube | 0.65 | 0.75 | 0.80 | 0.60 | 0.70 |
| Core composition: | | | | | |
| Mg(14)-Ni | 10 | 10 | 8 | 11 | 8 |
| Graphite | 15 | 15 | 18 | 10 | 12 |
| Aluminum | 3 | 2 | ----- | 1 | 1 |
| CaF₂ | 49 | 45 | 51 | 35 | 75 |
| MgO | 2 | 1 | 2 | 1 | 1 |
| Calcium(30) | 5 | 5 | 6 | 4 | 4 |
| Silicon | ----- | ----- | ----- | ----- | ----- |
| Manganese | 5 | 5 | 10 | 8 | 4 |
| Cryolite | 5 | 5 | 10 | 8 | 4 |
| Barium Fluoride | 2 | 2 | 1 | 2 | 1 |
| Fe (powder) | 4 | ----- | ----- | 10 | ----- |
| Ni (powder) | ----- | 10 | 5 | 10 | ----- |

In addition to the examples of welding electrodes in accordance with the present invention as set forth in Tables II and VII, applicant has also made an operable welding electrode from strip containing, in percent by weight, a minimum of about 99 percent nickel (including a small impurity amount of cobalt), about 0.08 percent carbon, about 0.18 percent manganese, about 0.2 percent iron, about 0.005 percent sulfur, about 0.18 percent silicon and about 0.13 percent copper. The electrode was made in essentially the same manner as the electrode of Example 5 using the same flux composition. An open-arc weld deposit of an iron base made with this high nickel welding electrode of the present invention contained in percent by weight 1.67 percent carbon, 1.02 percent manganese, 9.83 percent iron, 0.002 percent sulfur, 0.92 percent silicon, 0.34 percent aluminum, 0.07 percent titanium, 0.043 percent magnesium, with the balance being essentially nickel. This weld deposit, like all the weld deposits made with electrodes of the present invention contains more than about 1.1 percent carbon. The iron in this weld deposit was derived essentially from the base metal being welded.

As mentioned hereinabove, the welding electrodes of the present invention are useful in the welding of gray cast iron, i.e., cast iron containing graphite in the form of flakes, ductile iron, i.e., cast iron containing graphite in the form of spheroids produced at the time of casting, malleabilized iron and other weldable ferrous base materials. The welding electrodes of the present invention are particularly useful in welding ductile iron structures to themselves and to steel to high nickel-copper alloy, to nickel and to nickel-chromium alloys.

It is to be noted that where appropriate, both English and metric units have been used in this specification. The original work upon which this specification has been based was done using customary English units, the metric units being obtained by conversion. If, for any reason, there is a discrepancy between values represented by English units and values represented by metric units, the value in English units should prevail.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A welding electrode particularly adapted to be coil-fed to automatic welding machines and to weld cast iron at high rates using an open-arc comprising a tubular sheath of metal containing about 45 percent to about 100 percent by weight of nickel with the balance, if any, being essentially iron enclosing a core comprising a mixture of powders containing, in percent by weight of core ingredients, about 0.7 percent to about 3.5 percent of metallic magnesium, about 5 percent to about 25 percent graphite and about 30 percent to about 75 percent calcium fluoride, the balance of said core comprising slag forming and metallic ingredients said core being balanced with respect to said tubular sheath such that said tubular sheath comprises about 55 percent to about 80 percent by weight of the total electrode, such that the total percent of metallic nickel plus metallic iron in the total electrode is about 65 percent to about 80 percent and such that the ratio of nickel to metallic iron in the total electrode is at least about 0.67.

2. A welding electrode as in claim 1, wherein the core contains as metallics in percent by weight of the core mixture
up to about 10 percent aluminum;
up to about 3 percent calcium;
up to about 7 percent silicon;
up to about 15 percent manganese;
up to about 5 percent titanium;
up to about 25 percent iron;
up to about 36 percent nickel;
up to about 6 percent columbium;
up to about 4 percent molybdenum;
up to about 6 percent rare earth metal silicide and
up to about 1 percent tungsten.

3. A welding electrode as in claim 1, wherein the tubular sheath comprises a nickel-iron alloy containing about 45 percent to about 75 percent by weight of nickel.

4. A welding electrode as in claim 1, wherein the core contains as non-metallic ingredients in percent by weight of the core mixture
up to about 15 percent cryolite;
up to about 6 percent magnesium oxide;
up to about 4 percent barium fluoride;
up to about 5 percent barium carbonate;
up to about 5 percent strontium carbonate;
up to about 25 percent calcium carbonate;
up to about 10 percent manganese dioxide;
up to about 4 percent zirconium oxide;
up to about 20 percent alumina;
up to about 20 percent calcium silicate;
up to about 10 percent ferric oxide;
up to about 5 percent lithium carbonate;
up to about 5 percent lithium fluoride;
up to about 20 percent nepheline syanite;
up to about 5 percent potassium zirconium fluoride;

up to about 10 percent titanium dioxide and
up to about 10 percent sodium fluoride.
p to abofc per tfngsten.

5. A welding electrode as in claim 1 containing in percent by weight of total electrode about 1.5 to 7.5 percent carbon, up to about 7.5 percent manganese, about 9 percent to about 42 percent iron, about 29 percent to about 76 percent nickel, the total of the iron and nickel being about 65 percent to about 85 percent, up to about 2.5 percent metallic silicon, up to about 0.7 percent copper, up to about 2 percent aluminum, up to about 1 percent metallic calcium, about 0.25 percent to 1 percent metallic magnesium, about 8 percent to about 18 percent calcium fluoride, up to about 3 percent cryolite, up to about 1.5 percent barium fluoride and about 0.25 percent to about 1.5 percent magnesium oxide.

6. A welding electrode as in claim 1, wherein the metal of the sheath comprises in percent by weight about 50 percent to about 99 percent nickel, about 0.18 percent to about 0.42 percent manganese, about 0.11 percent to about 0.30 percent silicon, about 0.01 percent to about 0.08 percent carbon, with the balance being essentially iron.

7. A welding electrode as in claim 1, wherein the core contains in percent by weight about 8 percent to about 11 percent of a nickel magnesium alloy containing about 14 percent metallic magnesium, about 10 percent to about 18 percent graphite, up to about 6 percent metallic aluminum, about 35 percent to about 75 percent calcium fluoride, about 1 percent to about 2 percent magnesium oxide, about 4 percent to about 6 percent calcium silicon alloy containing about 30 percent calcium, about 4 percent to about 10 percent manganese, about 4 percent to about 10 percent cryolite, up to about 2 percent barium fluoride, up to about 1 percent strontium carbonate, up to about 10 percent iron powder and up to about 10 percent nickel powder.

8. The process of welding comprising maintaining an electric arc between a workpiece to be welded and the electrode of claim 1 and depositing on said workpiece by means of said arc graphite-containing metal derived from the electrode of claim 1.

* * * * *